United States Patent
Steinich

(10) Patent No.: US 6,469,498 B1
(45) Date of Patent: Oct. 22, 2002

(54) METHOD AND ARRANGEMENT FOR THE TRANSMISSION OF USEFUL SIGNALS IN MAGNETOSTRICTIVE POSITION SENSORS

(75) Inventor: Klaus-Manfred Steinich, Poering (DE)

(73) Assignee: ASM Automation Sensorik Messtechnik GmbH, Unterhaching (DE)

( * ) Notice: Subject to any disclaimer, the term of this patent is extended or adjusted under 35 U.S.C. 154(b) by 0 days.

(21) Appl. No.: 09/462,422

(22) PCT Filed: Jun. 19, 1998

(86) PCT No.: PCT/EP98/03762

§ 371 (c)(1),
(2), (4) Date: Jan. 10, 2000

(87) PCT Pub. No.: WO99/02944

PCT Pub. Date: Jan. 21, 1999

(30) Foreign Application Priority Data

Jul. 8, 1997 (DE) .......................................... 197 29 169

(51) Int. Cl.$^7$ ................................................ G01B 7/14
(52) U.S. Cl. .............................. 324/207.13; 524/207.24
(58) Field of Search .................. 324/207.13, 207.17, 324/207.12, 207.24, 260; 702/94; 333/242, 148; 73/609, 584, 290 V, 313, 314

(56) References Cited

FOREIGN PATENT DOCUMENTS

| DE | 3131455 A | 3/1983 |
| EP | 0153437 A | 9/1985 |
| WO | Wo 92/145844 | 9/1992 |
| WO | WO 97/23765 | 7/1997 |

*Primary Examiner*—Jay Patidar
(74) *Attorney, Agent, or Firm*—Crowell & Moring LLP

(57) ABSTRACT

Claimed are a method and an arrangement for the transmission of useful signals of a magnetostrictive position sensor which is arranged within a housing, including a control circuit (1) for generating an electrical control pulse, a pulse generator (2) for exciting current pulses in the ultrasonic exciter circuit (6), an ultrasonic pulse detector (3) which upon the reception of an ultrasonic pulse on a magnetostrictive waveguide supplies a corresponding electrical reply signal, and an evaluation circuit (4) for determining the relative position of a position marking (magnet) which is displaceable along the waveguide. Therein the individual circuits of the electronics of the magnetostrictive sensor are to be supplied by way of a cable which is of thinner cross-section and both control pulses and also reply pulses are to be transmitted as useful signals by way of that cable. That is achieved in that the circuits within the housing are coupled to those outside the position sensor housing by way of a two-pole electrical line on which the supply voltage is superimposed with the respective useful signal.

20 Claims, 3 Drawing Sheets

METHOD AND ARRANGEMENT FOR THE TRANSMISSION OF USEFUL SIGNALS IN MAGNETOSTRICTIVE POSITION SENSORS

BACKGROUND AND SUMMARY OF THE INVENTION

The invention concerns the electrical circuitry of magnetostrictive position sensors and in particular an electronic arrangement for the production of electrical current pulses in an ultrasonic exciter circuit of a magnetostrictive position sensor and for evaluation of the ultrasonic pulses on a magnetostrictive waveguide in order thereby to determine the relative position of a position marking (magnet) which is displaceable on the magnetostrictive waveguide.

Electrical pulses are required to operate the most widely varying range of electrical devices and apparatuses. Such a device is an ultrasonic position sensor in which an electrical current pulse is passed through an electrical conductor which is surrounded by a magnetostrictive waveguide such as for example a magnetostrictive tube. An external magnet serves as a position marking which is displaceable along the magnetostrictive waveguide and generates a stationary magnetic field which interacts with the circular magnetic field of the current pulse which is passed through the exciter circuit (electrical conductor). That interaction gives rise to an ultrasonic pulse in the waveguide which is propagated along the latter. That ultrasonic pulse is detected at a reference position, usually the end of the magnetostrictive waveguide, by a detector. The period of time between triggering of the exciter current pulse and reception of the ultrasonic pulse is a measurement in respect of the distance of the displaceable position magnet from the detector.

A distinction is to be made in respect of the following circuits, for electrical control of such an ultrasonic position sensor and for evaluation and processing of the ultrasonic waves which pass along the magnetostrictive waveguide:

a control circuit for generating an electrical control pulse with which a pulse generator is controlled, a pulse generator for generating an electrical current pulse in the ultrasonic exciter circuit of the ultrasonic position sensor, an ultrasonic pulse detector for generating an electrical reply signal from the ultrasonic pulse which was produced by the exciter pulse, and an evaluation circuit for evaluation and further processing of the electrical reply signal, with which the relative position of a displaceable position magnet can be ascertained.

The above-mentioned operational circuits are generally connected to a supply potential. Furthermore it is known for regular control pulses to be transmitted from the control circuit to the pulse generator by way of separate lines and for the electrical reply signals to be transmitted to the evaluation circuit by a further conductor. Therefore up to six lines are required for the control and reply signals (useful signals) and the supply voltage, including the respective return conductors. The above-mentioned lines are generally combined in a cable which leaves the housing of the ultrasonic position sensor through an opening. The thickness of the cable means that the corresponding opening must be correspondingly large, which on the one hand makes it difficult to achieve sealing integrity in relation to harmful environmental influences while on the other hand representing a weak location in terms of compliance with EMC-requirements (electromagnetic compatibility).

a) Technical Object

Therefore the object of the present invention is to supply the individual operational circuits of the electronic system of a magnetostrictive sensor by way of a cable of thinner cross-section and to transmit both control and also reply signals (useful signals) by way of that cable.

b) Attainment of the Object

In accordance with the invention that object is attained by the features recited in the characterising portions of the independent claims. Advantageous configurations of the invention are set forth in the appendant claims.

The fact that the steady supply voltage is superimposed with frequent control and reply signals on the supply potential conductor means that a two-pole line is sufficient for transmission of the signals. If, by virtue of the arrangement of the individual circuits, the signals have to be transmitted bidirectionally by way of the two-pole line, it is possible to make use of the fact that there is a certain period of time, more specifically precisely the transit time of the ultrasonic wave on the magnetostrictive conductor, between the generation of a control pulse and transmission of the reply signal in the opposition direction, whereby the signals cannot interfere with each other. The clock frequency of the control pulses is to be selected to be sufficiently great.

The method according to the invention includes the following steps:

generating a current pulse in order to trigger a current pulse in the exciter circuit of a magnetostrictive position sensor, transmitting the control pulse to a switch of a pulse generator, triggering the current pulse in the exciter circuit of the magnetostrictive position sensor, detecting and converting an ultrasonic pulse into an electrical reply signal, and transmitting the reply signal to an evaluation circuit in order to determine the relative position of a magnet on the waveguide.

The circuits required are disposed in part inside and in part outside the housing of the position sensor. If the useful signals (control pulse and reply signal respectively) are transmitted into the housing or in the opposite direction respectively by virtue of the arrangement of the circuits, that is preferably implemented by way of a two-pole electrical line, with the useful signal in question being superimposed on the supply potential. At least the useful signals from and to the evaluation circuit are transmitted by way of the two-pole supply line.

Coupling-out and transmission of the useful signals on the supply conductor is not absolutely necessary between circuits which are disposed either jointly within or outside the position sensor housing. If a useful signal within one of the regions (inside or outside the housing) is to be transmitted to another circuit, that can also be implemented by way of a direct line.

The control pulse generated by the control circuit is preferably transmitted to the evaluation circuit on the supply conductor and used for initialisation of the evaluation circuit, that is to say for example a flip-flop is set and a counter is started, as is known for example from U.S. Pat. No. 4,721,902 to Tellerman et al. The signal received after a given transit time of the ultrasonic waves at the ultrasonic pulse detector is converted into an electrical reply signal and goes back to the evaluation circuit by way of the supply potential conductor, preferably a two-pole line such as for example a coaxial line, in the opposite direction to the control signal. It is however also propagated in the direction of the pulse generator on the supply line.

In order to prevent the reply signal once again triggering a current pulse in the ultrasonic exciter circuit, it is relatively weakly amplified in the ultrasonic pulse detector and is of a substantially lower amplitude than the control signal. That means that the switching threshold of a switch in the ultrasonic exciter circuit is not exceeded.

The individual circuits of the electronic system of an ultrasonic position sensor are—if necessary—preferably respectively connected at their supply connections to the supply conductor and are thus at the supply potential. Inputs and outputs which serve for the transmission of useful signals by way of the supply conductor are decoupled from the supply potential by suitable impedances such as for example capacitance means. The supply connections of the individual circuits in contrast are decoupled from high-frequency signals by suitable filters such as for example inductors or LC-low pass filters in order to guarantee a stable current supply and in order to decouple the useful signals to be transmitted from the low-resistance paths of the current supply.

A coaxial line is preferably used as the supply line. The arrangement of the individual circuits with respect to the coaxial line is variable, in which case for example the control circuit can also be arranged to the right of the coaxial line in FIG. 1. Likewise the pulse generator, excluding the switches 7, can be arranged to the left of the coaxial line 5. In this case the circuits to the right of the line would be at the increased output voltage of a booster device which is part of the pulse generator. That voltage can be regulated to the desired value for example by voltage regulators for the circuits arranged on the right-hand side in FIG. 1.

A fundamentally different solution proposes a two-pole line for signal transmission, on which however there is no dc voltage as a supply voltage. The energy necessary for powering the individual circuits is ensured in particular solely by the energy of the exciter current pulses. A charge storage means, preferably a storage capacitor, is charged up with a part of the energy of the exciter current pulse. The voltage at the capacitor can be fed to other circuits such as for example the pulse detector as a supply voltage.

BRIEF DESCRIPTION OF THE DRAWINGS

The invention is described by way of example hereinafter with reference to the figures in which.

DETAILED DESCRIPTION OF THE PREFERRED EMBODIMENTS

Figure 1:
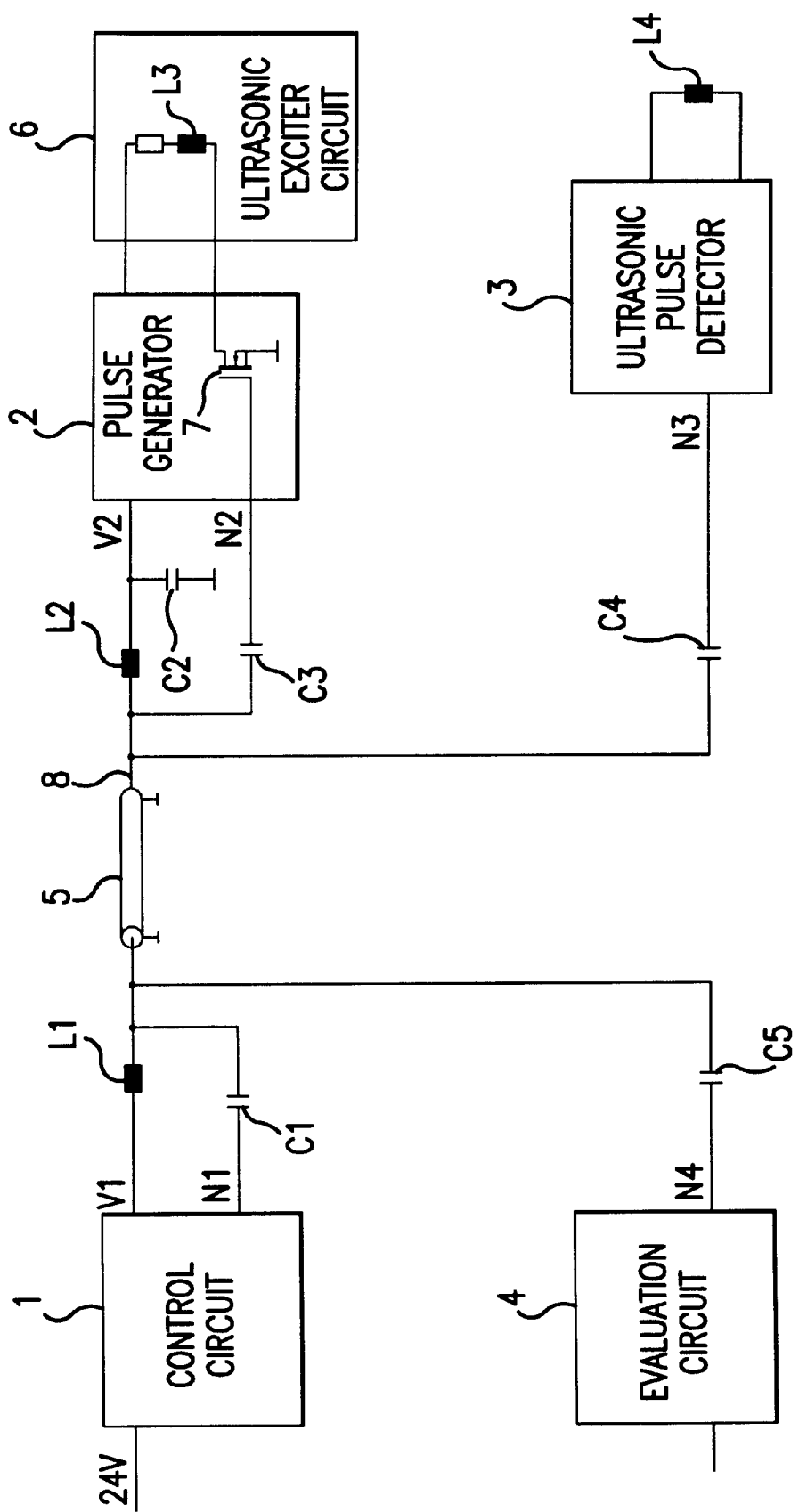
FIG. 1 shows a schematic circuit diagram of an arrangement for the bidirectional transmission of pulses by way of a two-pole electrical line.

The arrangement according to the invention includes essentially:

a control circuit 1 for generating short electrical current pulses for a switch 7;

a pulse generator 2 for exciting current pulses in the ultrasonic exciter circuit 6, with known circuits, such as for example a pulse regulator, a voltage booster etc, wherein electrical pulses are triggered by closure of the switch 7 in the ultrasonic exciter circuit 6 of the position sensor;

an ultrasonic pulse detector 3 which upon the reception of an ultrasonic pulse at the magnetostrictive waveguide generates a corresponding electrical reply signal; and an evaluation circuit 4 for determining the relative position of a position marking (magnet) displaceable on the waveguide, wherein the transit time of the ultrasonic pulse through the waveguide, beginning with generation of the current pulse until reception by the ultrasonic pulse detector, is a measurement in respect of the magnet position to be measured.

The individual circuits are arranged in part within the housing, this being in FIG. 1 to the right of the coaxial line 5, and in part outside the housing, in FIG. 1 to the left of the coaxial line 5. Besides the supply connections V1–V2 the above-indicated circuits 1 through 4 each have at least one useful signal input and output N1–N4 respectively. Those inputs and outputs are coupled to the supply potential conductor 8 by way of suitable impedances such as for example the capacitors C1, C3, C4, C5. In that way the dc component is decoupled from the respective circuit and only the useful signals, such as for example the control pulse or the reply signal, are transmitted.

In contrast thereto, the supply connections V1–V2 are decoupled from high-frequency signals on the supply potential conductor 8 by means of suitable impedances such as for example inductors L1, L2 in order to guarantee a stable supply voltage and in order to decouple the useful signals to be transmitted from the low-resistance paths of the power supply. That decoupling effect can also be implemented by way of LC-filters L2, C2 which act as low pass filter means.

The supply potential conductor 8 is preferably the internal conductor of a coaxial cable 5.

The function in principle of the arrangement is described hereinafter:

Firstly the control circuit 1 generates a current pulse which is propagated by way of the potential conductor and which is thereby available for other circuits, in particular for the switch 7 and the evaluation circuit 4. The switch 7 which is preferably part of the pulse generator 2 and in particular an MOS-transistor is briefly conducting and triggers a current pulse in the ultrasonic exciter circuit 6. At the same time the current pulse is used to initialise the evaluation circuit 4, that is to say to start a counting operation.

The transit time of the ultrasonic pulse through the waveguide, beginning with generation of the current pulse up to reception by the ultrasonic pulse detector 3, is a measurement in respect of the magnet position to be measured. The ultrasonic pulse detector 3 converts the ultrasonic pulse into an electrical signal which in turn is coupled on to the potential conductor and which can be propagated there to other circuits 1 through 4.

The reply signal thus also reaches the switch 7 of the pulse generator 2 but cannot activate it as the amplitude of the reply signal is substantially less than the amplitude of the control pulse. In particular the amplitude of the control pulse is at least twice as great as the amplitude of the reply signal.

The reply signal also reaches the evaluation circuit 4 by way of the supply line 8, and stops the counting operation in the evaluation circuit. If the speed of propagation of the ultrasonic wave on the magnetostrictive conductor is known, the precise magnet position can be calculated.

Figure 2:
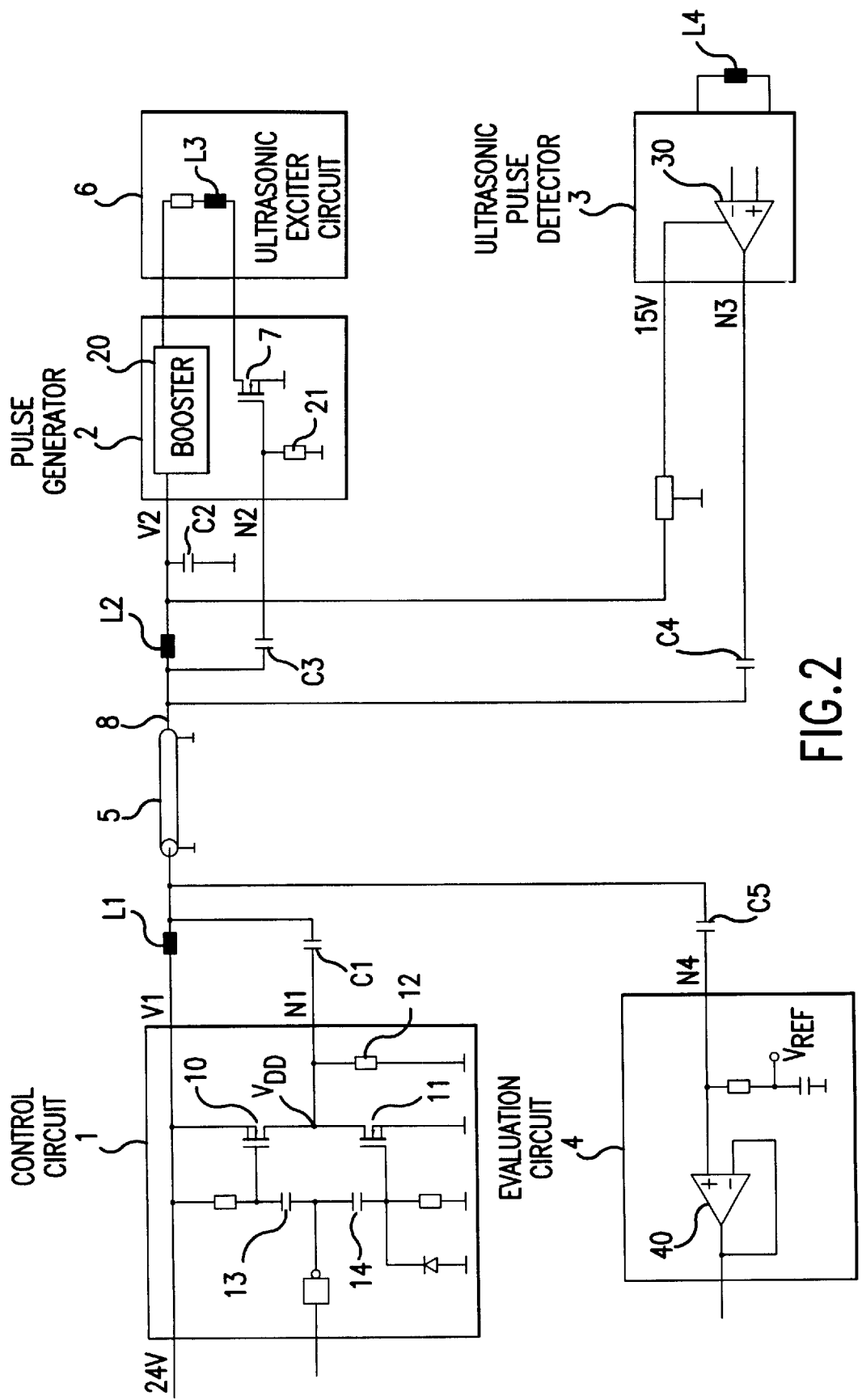
FIG. 2 shows a more detailed circuit diagram of the arrangement according to the invention in FIG. 1.

FIG. 2 shows a more detailed circuit diagram of the arrangement according to the invention. The control circuit 1 includes two switches, in particular MOS-transistors 10, 11 of different types, which are connected in series. When the MOS-transistor 10 is conducting, the center potential between the transistors 10 and 11 is raised to the supply voltage $V_{DD}$ and generates a positive signal edge. Thereafter the MOS-transistor is switched to high resistance again and the transistor 11 conducts. In that way the center potential is reduced to ground potential and a falling pulse edge of the current pulse is produced.

In addition the control circuit includes a resistor 12 which is connected between center potential and ground, two capacitors 13 and 14 with a common connection and a respective connection to the gate terminal of an MOS-transistor 10, 11. The control signal output is terminated with a capacitor C3 and the power output with an inductor L1.

The pulse generator 2 includes a booster 20 whose output voltage can preferably be established in any ratio with respect to the input voltage, and an N-channel MOS-transistor 7.

Connected upstream of the supply terminal of the pulse generator 2 are an inductor L2 and a capacitor C2 between V2 and ground. A capacitor C3 is connected upstream of the useful signal input. The gate terminal of the MOS-transistor 7 is connected to a resistor 21 and the capacitor C3. The ultrasonic pulse detector 3 includes a detector coil L4 and a pulse amplifier 30 with a 15V voltage supply. Connected upstream of the useful signal output is a capacitor C4 which decouples the output from the supply voltage.

The capacitors C1, C3, C4 and C5 are respectively connected to the potential conductor.

The evaluation circuit 4 includes a further pulse amplifier 40 and a reference voltage connection $U_{REF}$. The output of the pulse amplifier 40 is connected to an evaluation logic (not shown).

In this embodiment transmission of the useful signals is effected by way of the potential conductor which in this case is in the form of a coaxial cable section.

Figure 3:
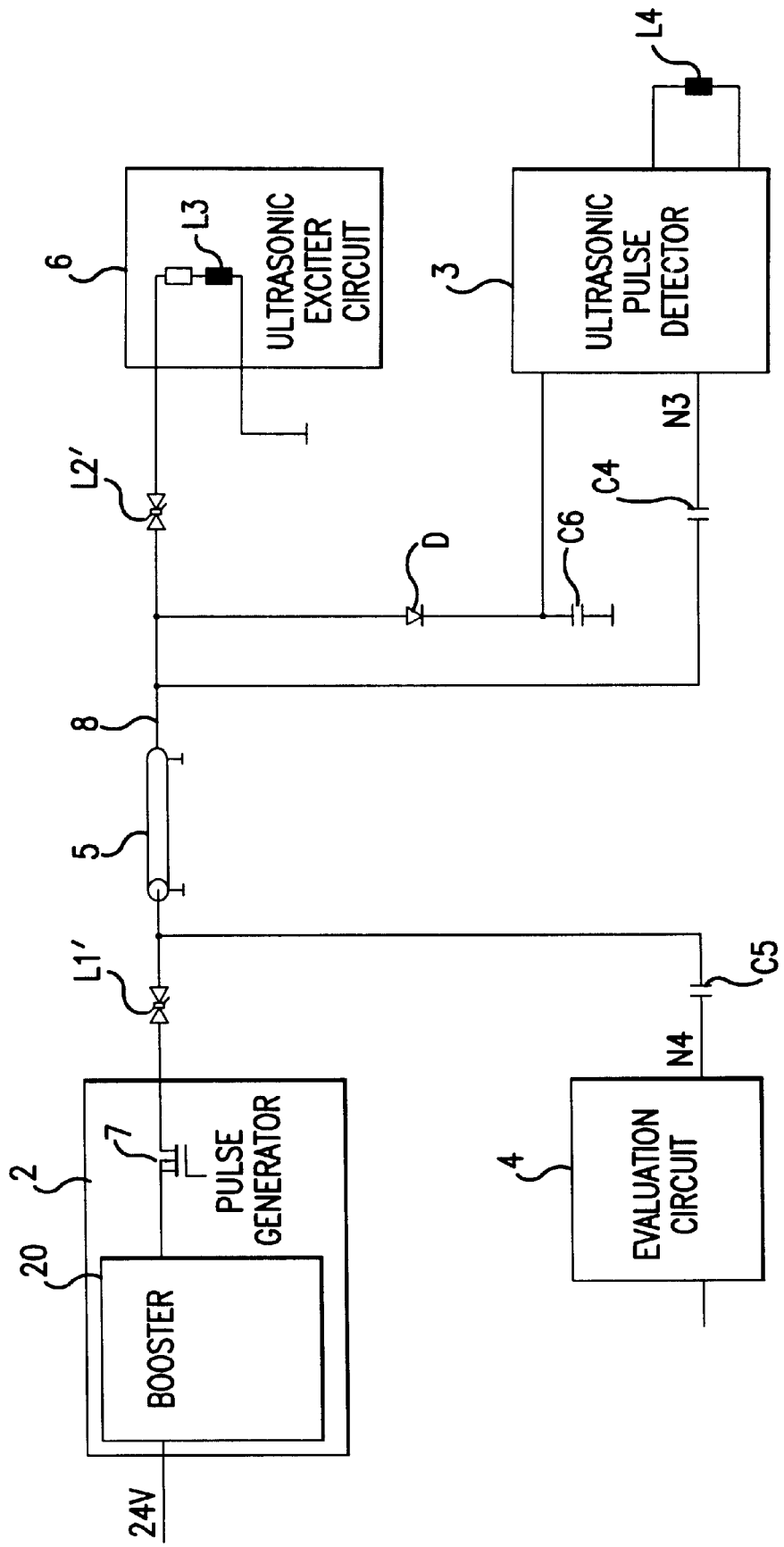
FIG. 3 shows a schematic circuit diagram of a second embodiment of the arrangement according to the invention.

In the embodiment shown in FIG. 3 there is no supply voltage on the conductor 8. In this case only the exciter current pulse and the reply signal are transmitted by way of the two-pole electrical line (coaxial line 5).

Arranged outside the position sensor housing (to the left of the coaxial line 5) is a pulse generator 2 including a booster (voltage booster) and a switch 7. The impedances L1, L2 in FIG. 1 are here in the form of switches. Preferably in this case the impedances L1, L2 are trigger diodes L1', L2' which become conducting when reaching a given trigger voltage and which are previously of high resistance, with a trigger voltage of between preferably 20 and 50 volts. In place of the trigger diodes L1', L2' it is also possible for example to use Zener diodes.

When the switch 7 is closed the exciter pulse is transmitted into the housing by way of the conductor 8 and passed to the ultrasonic exciter circuit 6 by way of the trigger diode L2'. At the same time the exciter pulse reaches a storage capacitor C6 by way of a diode D. The capacitor C6 is charged up with a part of the energy of the exciter pulse, whereby a voltage is built up. That is passed as a supply voltage to the pulse detector 3. A dc voltage potential therefore does not have to be transmitted by way of the conductor 8.

The output N3 of the pulse detector 3 is coupled to the conductor 8 by way of a capacitor C4. As in the embodiments of FIGS. 1 and 2 the reply signal is coupled out by way of the capacitor C4 on to the conductor 8 and passed by way of the coaxial cable 5 to the evaluation circuit. In this embodiment the number of circuits and thus components within the housing can be greatly reduced.

What is claimed is:

1. A method for the transmission of useful signals of a magnetostrictive position sensor which is arranged within a housing, including the acts of:

generating an electrical current control pulse, transmitting the electrical current control pulse to a pulse generator in order to trigger an ultrasonic current pulse in an ultrasonic exciter circuit of the magnetostrictive position sensor, detecting said ultrasonic pulse and converting the ultrasonic pulse into an electrical reply signal by an ultrasonic pulse detector, and transmitting the reply signal to an evaluation circuit, whereby transmission of useful signals constituted by a plurality of said electrical current control pulses and reply signals between first circuits within the housing and second circuits outside the housing is effected on the supply potential conductor of a two-pole electrical line, the supply voltage being superimposed with a respective useful signal.

2. A method as set forth in claim 1, wherein the two-pole electrical line is a coaxial line.

3. A method as set forth in claim 1, wherein the control pulse is used for initialising the evaluation circuit.

4. A method as set forth in claim 1, wherein the amplitude of each of the control pulses is at least twice as great as the amplitude of each of the reply signals.

5. An arrangement for the transmission of useful signals on the supply potential conductor of a magnetostrictive position sensor which is arranged within a housing, comprising:

a control circuit for generating an electrical current control pulse, an ultrasonic exciter circuit, a pulse generator for exciting ultrasonic current pulses in the ultrasonic exciter circuit, an ultrasonic pulse detector which supplies, upon the reception of an ultrasonic pulse on a magnetostrictive waveguide, a corresponding electrical reply signal, and an evaluation circuit for determining a position of a position marking device which is displaceable on the waveguide, the control circuit, the pulse generator, the ultrasonic pulse detector and the evaluation circuit each having at least a supply connection and useful signal input and output devices, and a two-pole electrical line coupling at least one first electrical circuit within the position sensor housing to a respective one of at lease one second electrical circuit outside the position sensor housing.

6. An arrangement as set forth in claim 5, wherein the position marking device is a magnet.

7. An arrangement as set forth in claim 5, including impedance units for decoupling the useful signal input and output devices which are coupled to the supply potential conductor of the two-pole electrical line from the supply potential.

8. An arrangement as set forth in claim 7, wherein the impedance units are capacitors.

9. An arrangement as set forth in claim 7, including a decoupling impedances decoupling the supply connections from high-frequency useful signals.

10. An arrangement as set forth in claim 9, wherein the decoupling impedances are inductors.

11. An arrangement as set forth in claim 9, wherein the decoupling impedances are LC low pass filters.

12. An arrangement as set forth in claim 5,
wherein the ultrasonic pulse detector includes a pulse amplifier.

13. A method for the transmission of useful signals of a magnetostrictive position sensor which is arranged within a housing, including the acts of:

generating an electrical current control pulse, transmitting the electrical current control pulse to an ultrasonic exciter circuit of the magnetostrictive position sensor, detecting an ultrasonic pulse caused by the current control pulse and converting the ultrasonic pulse into an electrical reply signal by means of an ultrasonic pulse detector, and transmitting the reply signal to an evaluation circuit, wherein at least one of the electrical current control pulse and the reply signal are transmitted on a two-pole electrical line, and no supply voltage is passed into the housing by way of the line.

14. A method as set forth in claim 13,
wherein an electrical storage device is charged by means of the electrical current pulse, at which storage device the supply voltage can be removed.

15. An arrangement as set forth in claim 14,
wherein the storage device is a storage capacitor.

16. An arrangement for the transmission of useful signals on the conductor of a magnetostrictive position sensor which is arranged within a housing, comprising:

a pulse generator for exciting current pulses in an ultrasonic exciter circuit to provide ultrasonic pulses, an ultrasonic pulse detector which supplies, upon the reception of an ultrasonic pulse on a magnetostrictive waveguide, a corresponding electrical reply signal, an evaluation circuit for determining a position of a position marking means which is displaceable on the waveguide, and a two-pole electrical line coupling at least one first electrical circuit within the housing to a respective at least one second electrical circuit outside the housing, wherein one of said exciting current pulse and said reply signal respectively is transmitted on the line.

17. An arrangement as set forth in claim 16, including
switch means for decoupling at least the exciter circuit and the pulse generator from the reply signals.

18. An arrangement as set forth in claim 17,
wherein the switches are trigger diodes.

19. An arrangement as set forth in claim 17,
wherein the switches are Zener diodes.

20. An arrangement as set forth in claim 16,
wherein the pulse generator is arranged outside the housing.

* * * * *